United States Patent Office 3,424,677
Patented Jan. 28, 1969

3,424,677
METHOD OF REMOVING WATER FROM SALT SOLUTIONS
Peter van der Heem, Pittsburgh, Pa., assignor to Koppers Company, Inc., a corporation of Delaware
No Drawing. Filed Sept. 24, 1965, Ser. No. 490,058
U.S. Cl. 210—59          1 Claim
Int. Cl. C02b 1/18

ABSTRACT OF THE DISCLOSURE

Water is removed from an aqueous salt solution by froming a solid hydrate comprising one mole of gaseous trichlorofluoromethane and two moles of gaseous carbon dioxide with seventeen moles of water, and decomposing the hydrate to remove the gaseous products and produce potable water.

---

This invention relates to the separation of water as a solid hydrate from aqueous salt solutions.

This invention arose during performance pursuant to a contract with the United States Government, Office of Saline Water.

Donath Patent No. 2,904,511 describes a method for producing purified water from an aqueous salt solution by contacting the salt solution with a gas that forms a solid hydrate with water, separating the hydrate from the saline water, and decomposing the hydrate to obtain the water that is free from the salt. Preferred hydrate-forming substances, according to the patent, are carbon dioxide and a paraffinic hydrocarbon having from 1 to 4 carbon atoms, but other suitable hydrate-forming substances are listed as being ethylene, acetylene, methyl chloride, ethyl fluoride, chlorine and argon. Hydrates, according to Miller et al. Patent No. 3,059,033, can be formed from a liquid chlorinated derivative of methane such as methylene chloride, chloroform and carbon tetrachloride and a rare gas such as argon, krypton or xenon. However, rare gases are much too expensive for use in the purification of water in large quantities from sea or brackish water of course, and chlorinated derivatives of methane are much too poisonous to be used to produce potable water, and an additional liquid-liquid separation is required.

I have now discovered that gases which are readily available can be mixed to form a hydrate that decomposes at temperatures equal to or higher than the individual simple hydrates. Particularly, I have found that when trichlorofluoromethane and carbon dioxide are mixed, the gases form a hydrate which decomposes under atmospheric pressure at a temperature higher than the hydrate formed from either gas alone. These gases are readily available: trichlorofluoromethane is well-known as Refrigerant 11, and caron dioxide is widely used in commercial processes. An important factor is that both carbon dioxide and the trichlorofluoromethane are relatively non-toxic. Trichlorofluoromethane forms a hydrate which decomposes at one atmosphere absolute at 8.9° C., and carbon dioxide forms a hydrate which decomposes under the same conditions at −24° C. I have found that the mixture of these two gases forms a hydrate which has a decomposition temperature at one atmosphere pressure of 9.3° C. Thus, I am able to carry out a process such as described in the aforementioned Donath patent with the hydrate of my invention under more favorable circumstances than those described in the Donath patent. The hydrate has the general formula:

$$CFCl_3 \cdot 2CO_2 \cdot 17H_2O$$

On the other hand, when it is desired to increase the salt content of the water or the characteristics of the water or the water separated from the salt solution is not used for human consumption, I have found that the trichlorofluoromethane forms hydrate with other readily available gases and such hydrates can be used to separate the water. Listed below aer the hydrates and their decomposition temperatures:

| Gas: | Decomposition temperature of hydrate at 1 atmosphere, degree C. |
|---|---|
| $CFCl_3$ | 8.9 |
| $SO_2$ | 7.0 |
| $CFCL_3 + SO_2$ | 9.9 |
| $CO_2$ | −24 |
| $CFCl_3 + CO_2$ | 9.3 |
| $H_2S$ | 0.35 |
| $CFCl_3 + H_2S$ | 14.7 |
| $Cl_2$ | 9.6 |
| $CFCl_3 + Cl_2$ | between 11.1 and 12.5 |
| $CFCl_3 + CH_2FCl + H_2S$ | 15.3 and 19.5 |

In accordance with this invention, aqueous salt solution is contacted with a gaseous mixture of one mole of $CFCl_3$ and two moles of $CO_2$ under hydrate-forming conditions. The solid hydrate that forms is removed from the solution and decomposed to water and gas. The gas can be recycled to be reused as the hydrate-forming gas. The steps of contacting a gas with a salt solution to form a solid hydrate and recovering the water is described in detail in the aforementioned Patent No. 2,904,511.

I claim:
1. In a process for removing water from an aqueous salt solution by foming a solid hydrate with the water and removing the water after decomposing the hydrate, the improvement which comprises mixing one mole of trichlorofluoromethane gas with two moles of carbon dioxide gas and contacting this gaseous mixture with the salt water whereby the gases form with the water a solid hydrate having the formula:

$$CFCl_3 \cdot 2CO_2 \cdot 17H_2O$$

References Cited

UNITED STATES PATENTS 3,027,320   3/1962   Buchanan _____ 210—59

OTHER REFERENCES

Saline Water Conversion Report for 1959; U.S. Dept. of Interior, Washington, D.C. pp. 10–12 (copy in group 176).

MICHAEL E. ROGERS, *Primary Examiner.*

U.S. Cl. X.R.

260—653